March 6, 1934.  S. MORSE  1,950,089
METHOD OF FORMING SOLID BODIES WITH PREDETERMINED
ARRANGEMENT OF CONSTITUENT PARTICLES
Filed Oct. 26, 1927
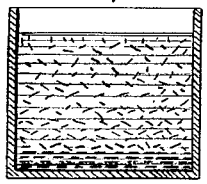
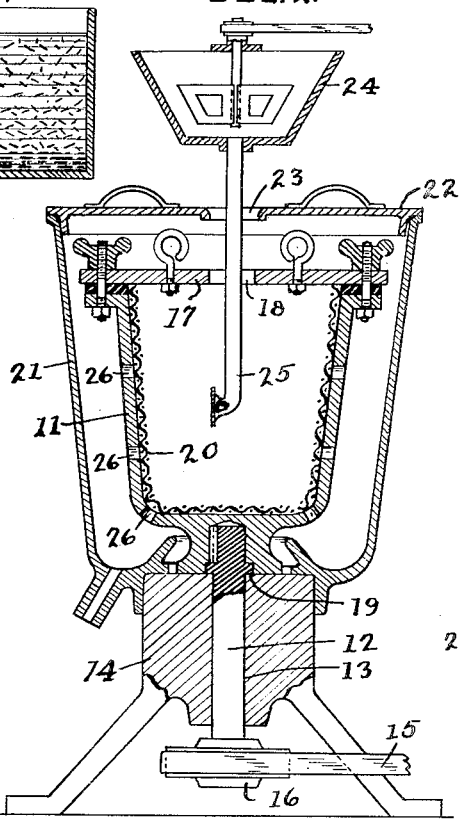
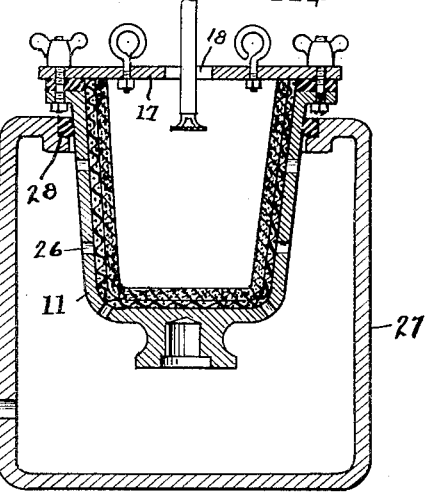
Inventor
Sterne Morse
By
Evans + McCoy
Attorneys Patented Mar. 6, 1934

1,950,089

UNITED STATES PATENT OFFICE 1,950,089

METHOD OF FORMING SOLID BODIES WITH PREDETERMINED ARRANGEMENT OF CONSTITUENT PARTICLES

Sterne Morse, Cleveland Heights, Ohio

Application October 26, 1927, Serial No. 228,823

10 Claims. (Cl. 18—47.5)

This invention relates to the process of disposing asymmetric flat particles in such manner that the individual particles shall be substantially layered or aligned in predetermined planes or surfaces. In particular it relates to the layering of flake or so-called amorphous graphite. Graphite is a crystalline material and exists as flat plates in which the physical properties such as thermal expansion or electrical resistance may be taken to be fairly uniform as measured along the plane of the plates, but these properties as so measured are very different from the values of the same properties as measured in a direction normal to the plates.

It is desirable for many purposes for which bodies made of graphite are used that the graphite be as far as possible disposed with adjacent particles similarly oriented, as nearly every important physical property of a graphite crystal such as electrical or heat conductivity, coefficient of thermal expansion, lubricating power, mechanical strength, resistance to abrasion, varies very markedly according as the direction is taken normal to or parallel to the cleavage planes.

As a general rule the physical properties of any crystal, in which symmetry in the three planes of reference does not exist, vary very considerably according to the plane along which they are measured. A given physical property of a solid made up from such crystals, such as thermal expansion, is in general averaged from the values of the thermal expansion of the individual crystals and will be the same in all directions if the arrangement of the crystals is random. On the contrary, when the arrangement is ordered the thermal expansion of the solid will vary from axis to axis much as does the thermal expansion of the individual crystal. It will be seen moreover that if the thermal expansion of the crystals composing a body in which they are disposed at random, varies greatly from axis to axis and if the body is exposed to great extremes of temperature, the differential expansion of the individual adjacent crystals is a powerful disintegrating agency, whereas if they are similarly oriented, no important differential expansion exists and this cause of disintegration will be lessened.

We frequently wish, moreover, that a given property of a crystalline body shall be at a maximum or minimum in a given direction and this condition can be most readily obtained when we have the crystals of which a body is composed similarly oriented. Bodies in which the particles are ordered are also much stronger and more impervious as a rule than the same material when the particles are unordered. It is consequently an object of this invention to produce a sheet of graphite with oriented particles, which can be rapidly punched out by a compacting press to form blocks in which the orientation of particles within the sheet is to a large extent preserved.

A further object resides in the fact that it is desirable in such a cylindrical object as a graphite crucible or bushing that the surfaces of arrangement be concentrically cylindrical rather than parallel planes and it is accordingly an object to devise a general method of disposition of flat particles in this or in any desired arrangement.

It is a fundamental property of the mechanics of a flat body suspended in an undisturbed fluid medium and subjected to a force tending to move it through the medium, that it tends to orient itself, so that one of its broad surfaces is normal to the line of motion of the particle through the liquid. If, therefore, we form a suspension of graphite in water or other liquid and allow it to settle, the undisturbed sediment will be practically completely oriented in the desired way and sheets or solid bodies of any desired shape may thus be made with the particles oriented in the desired manner.

In the drawing, Figs. 1 to 4 are diagrammatic representations of the principle involved in this invention and of means for its utilization.

Figure 1 is a diagrammatic representation in vertical section of a tank containing a suspension in a liquid, of flat particles heavier than the liquid showing sedimenting particles in process of orientation under influence of gravity to form a solid body.

Figs. 2 and 3 are diagrammatic representations in vertical section of a device suitable for the formation of a crucible, the particles forming the wall of which shall have a certain desired pattern of orientation.

Fig. 4 is a diagrammatic representation of the principle of operation of an apparatus for the production of a flat sheet of partially compacted graphite in which the individual particles are disposed relatively parallel to the plane of the sheet.

As a specific embodiment, the apparatus shown in Fig. 4 may be taken. A suspension of flat particles in a liquid is delivered through spout 1 into tank 2 in such manner as to disturb the liquid in this tank as little as possible. The tank 2 has for its bottom the sloping porous plate 3 over which runs the continuous porous belt 4 formed of filter cloth or some material of analogous type. The porous plate 3 separates tank 2 from the chamber 5, pressure in which, usually less than atmospheric, is maintained at the desired degree by pump 6. The inclination of the porous plate 3 from the horizontal will be dependent on the characteristics of the suspension, that shown, being for a relatively rapidly settling particle, i. e. for one fairly large or fairly heavy as compared to the liquid or both.

The suspended flakes as they settle tend to assume a position such as shown at the bottom of the tank in Fig. 1 and are deposited in a sheet 9 on the moving belt 4 in this general position and pass out of tank 3 upon it. Belt 4 then passes over the porous plate 7 forming a cover to chamber 8 in which a pressure less than atmospheric is maintained. The remaining liquid is sucked out of the sheet of material which is more or less dried by a down draft of heated air from hood 10, the sheet shrinking somewhat in all dimensions during this process. Depending on the characteristics of the cake formed and the suspension forming it, various methods of compacting and increasing the perfection of orientation such as agitation of the still plastic cake, spraying the top surface with the suspending fluid, the use of pressure such as the use of a second compacting filter belt, may be noted. This latter may be arranged to travel in the same direction as the first, and above it and at a continually decreasing distance for such position of the travel of the cake where it is still plastic.

It may be here remarked that the above mentioned apparatus may be considered to be a filter press forming a continuous cake and in point of fact a filter press may be so used as to produce cakes or continuous sheets which have the desirable characteristic which is the object of this invention.

Another embodiment of this invention is shown in Fig. 2 in order to illustrate the utilization of centrifugal force for a desired useful purpose, namely the construction of a crucible in which the particles will be substantially in a plane tangent to the cylindrical surface in which they lie. In this drawing, 11 is the bowl of a centrifugal machine, removably mounted on the vertical shaft 12 carried in the bearing 13 in base 14 and arranged to rotate on a vertical axis, power being applied by belt 15 running on pulley 16 mounted on shaft 12, which latter is retained in place by collar 19.

The bowl 11 is closed at the top by removable plate 17 with central hole 18. Fitting loosely within the bowl 11 is the porous vessel 20, the internal surface of which is formed in the shape desired for the outside of the crucible it is desired to fashion. The drip can 21 provided with a cover 22 in which is the central hole 23 is placed surrounding the bowl 11. A suspension of graphite together with a binder, if desired, may be contained in tank 24 which is arranged to be stirred and is supplied through delivery tube 25 which passes through the hole 23 in cover 22 and through the hole 18 in plate 17 to the interior of bowl 11. Liquid drains from the holes 26 in the surface of bowl 11 and overflows through sole 18.

There is also provided the vessel 27 shown in Fig. 3 which is of circular cross section, the upper lip of which curves inwardly, its edge formed of the rubber ring 28, which is so formed that the bowl 11, when removed from the machine shown in Fig. 2, may be set within as shown and form therewith an air-tight joint. The vessel 27 is provided with the tubulure 29, which is connected to a source of vacuum.

The operation of the crucible forming device shown in Figs. 2 and 3 will now be described. The bowl 11 is placed on shaft 12, filled with the suspending liquid, and started in rotation. As its speed is increased, the surface of the liquid tends to be depressed to substantially conical form with a downwardly directed apex of decreasing angle and when the surface of the liquid is depressed sufficiently so that this angle is equal to the conical angle formed by the side wall of the vessel 20, flat particles in the liquid will tend to assume an orientation tangent to concentric cones of equal angle. All this time the liquid has been passing through porous vessel 20 and outwardly through the holes 26 in the bowl 11 into the drip can 21, and also overflowing out of the hole 18 through the top plate. Liquid being continuously supplied from delivery tube 25 and conditions of flow being stable, the suspension is added from the delivery tube 25 rather than the pure liquid and a shell formed of the particles oriented as desired is built upon the lateral internal surface of the porous vessel 20. When this has assumed a proper thickness and density the bowl 11 is gradually slowed down in rotation, and the junction of the lateral surface and bottom of the crucible being meanwhile formed. When motion has ceased, the bowl 11 is removed from the shaft and placed as shown in Fig. 3 in the opening of vessel 27. A vacuum is produced outside of it and more of the suspension added until a bottom to the crucible of sufficient thickness and density is formed. After the flow of the suspension is interrupted, the formed crucible is more or less dried by suction, and the wall of the crucible may be compacted from the interior with a tool if necessary. The formed crucible is then removed from bowl 11, porous vessel 20 being then or later removed according to circumstances and the crucible dried and fired, as is the present usage in the art.

It will have been seen that the foregoing description reveals a general method by which the structure of the substance of a solid body formed by the compacting of particles of an asymmetric shape may be controlled. The process is susceptible of many modifications depending on the material used, the shape desired, and the desired properties of the solid body.

In the case, for example, where we desire to form a graphite resistor block suitable for use in a thermostatic heater such as is described in my copending application Serial No. 86,413, filed February 6, 1926, we in general desire that heat conduction to the external sheet shall be as good as possible while the electrical resistance from block to block shall be high. We further wish that the thermal expansion as measured from block to block shall be low. All these considerations make it desirabe that current pass in a direction normal to the crystal planes rather than parallel to them.

It has hitherto been assumed for purpose of simplicity of description, that the force tending to move the particle through the fluid be unchanging in magnitude and sign. This is not essential. If we, for example, impart to a liquid an oscillating mechanical force such for example as a beam of high frequency, high amplitude sound waves, we will tend to turn flat particles which are either heavier or lighter than the liquid so that their planes are normal to the direction of the beam, and charged particles may be similarly oriented by an alternating electric field. This late phenomenon extends to particles of molecular dimensions and is believed to be the cause of remarkable changes which the dielectric constant of certain liquids with an asymmetric molecule used as the dielectric of a condenser undergo, as the frequency of the potential on the condenser is varied.

The use of such alternating stress whether mechanical or electrical or in certain cases magnetic, represents a very flexible method of orienting a given set of particles. We may, for example, desire a thin cake in which flat particles instead of lying with their planes parallel to the plane of the cake are to be arranged so that their planes are perpendicular. By imparting a horizontal harmonic motion to the bottom of a tank containing a sedimenting suspension we can obtain a deposition of this character. This is due to the fact that when we impart such motion, this motion tends to set particles suspended in the fluid in a similar motion which is restricted by the inertia of the particle. If this particle is heavier than the liquid this resistance will cause the particle, with reference to the liquid, to move oppositely to the motion of the liquid, if lighter in the same direction.

It will thus be seen that I have provided a process of depositing asymmetric particles from a suspension in a fluid so that a solid body of stock material will be formed with the particles oriented in the desired manner, and that this deposit may be bodily compacted by pressure alone, by the solidification of a binder, by sintering, or in other ways, so that portions thereof with the arrangement of the particles preserved may be utilized to form solid bodies for various purposes, such as resistor blocks, brushes, and the like, or in other cases an entire body with some special pattern of particle orientation may be constructed.

It will be seen that by my method a particular arrangement of similar asymmetrical particles may be effected in the formation of a solid body whether the body be formed as a sheet or in some desired shape, such as a crucible, for example. The physical and electrical properties as regards a given surface or direction of that body may be greatly affected by such arrangement. Thus, the body may be harder or softer, denser or less dense, rigid or less rigid, more or less plastic. It may have a higher or low electrical resistance in a given direction, or the coefficient of thermal expansion or thermal conductivity may be greatly increased or decreased. In addition, the coefficient of friction on a given surface or the resistance to shearing, bending, or torsional stress may be widely changed and in special cases the resistance to corrosion may be altered.

It may also be noted that the mechanical strength and the durability in use of refractory material such as clays, for example, may be greatly improved by making the bricks or other objects from these clays with an ordered arrangement of the fine particles.

It will be seen that the method and means herein described are particularly applicable to the manufacture of articles from particles of graphite in order to affect their mechanical or electrical properties so that in a given direction these properties may be increased or decreased as desired.

It will also be seen that the graphite flakes may be suspended in a liquid of higher specific gravity so that under the influence of gravity they will be deposited in a layer at the top of the liquid and this layer may be removed and compacted in any desired manner.

It will also be seen that portions of the graphite cake may be subjected to the forming action of the press and pressure applied preferably in a direction normal to the planes of the cakes in order to preserve the ordered arrangement of the graphite particles and to make dense blocks for various purposes such as resistor blocks, brushes and the like.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of forming graphite resistor bodies, which consists of suspending the graphite particles in a liquid, sedimenting the particles to form a cake, compacting the cake so formed, and subjecting small portions of such cake to the forming action of a press.

2. The method of forming solid substantially cylindrical bodies composed of particles of asymmetric form having one relatively flat surface in which the pattern of orientation is concentrically cylindrical with the cylinder, which consists of suspending the particles in a fluid, subjecting them to a force which tends instantaneously to move them through the fluid in a direction determined by the direction of said force and so causing them to turn within the liquid so that their flat surfaces assume a position normal to the direction of such force, depositing them from such fluid while still subject to such force and forming a solid body composed of them.

3. The method of forming graphite substantially cylindrical bodies composed of flake graphite in which the individual flakes lie in a plane tangent to that of a cylindrical surface concentric with the axis of the cylinder, which consists in suspending the flakes in a fluid, subjecting them to a force which tends to move them through the fluid centrifugally, depositing the flakes from the fluid while still subject to such force in a cylindrical surface and thereby forming a cylindrical body with the individual flakes in planes substantially tangent to that of cylindrical surfaces concentric therewith.

4. The method of forming graphite bodies composed substantially of flake graphite, which consists in suspending the graphite particles in a fluid, subjecting them to a force which tends to move each particle through the fluid in a direction defined by the direction of the force at the point where the particle lies and so causing them to turn within the fluid that their flat surfaces assume a position normal to the direction of such force at the point at which the particle lies, depositing them from such fluid while still subject to such force, and pressing the deposited graphite particles to form a solid body.

5. The method of forming solid bodies composed substantially of flake graphite, which consists in suspending the graphite particles in a liquid, subjecting them to a force which tends to move each particle through the liquid in the direction determined by the direction of the force at the point where the particle lies, and so causing them to turn within the liquid that their flat surfaces assume a position normal to the direction of such force at that point, depositing them from such liquid while still subject to such force, and forming solid bodies composed of them.

6. The method of forming solid bodies composed substantially of relatively rigid flat particles, which consists of suspending the particles in a liquid, subjecting them to a force which tends to move each particle through the liquid in a direction determined by the direction of the force at the point at which the particle lies, and so causing them to turn within the liquid that their flat surfaces assume a position normal to the direction of such force, depositing them from such liquid while still subject to such force, and forming a solid body composed of them.

7. The method of forming solid bodies composed of relatively rigid flat particles which consists in suspending the particles in a fluid, subjecting them to a force which tends to move each particle through the fluid in a direction determined by the direction of the force at the point at which the particle lies, and so causing them to turn within the liquid that their flat surfaces assume a position normal to the direction of such force, depositing them from such fluid while subject to such force, forming a solid body composed of them, and compacting said body.

8. The method of forming solid bodies composed of flat particles, which consists in suspending the particles in a liquid containing a binder in solution, subjecting them to a force which tends to move each particle through the liquid in a direction determined by the direction of the force at the point at which the particle lies, so causing them to turn within the liquid that their flat surfaces assume a direction normal to the direction of such force at that point, depositing them from such liquid while subject to such force, and forming a solid body composed of the particles in such ordered arrangement.

9. The method of forming solid bodies composed of flat particles, which consists in suspending the particles in a liquid containing a binder in suspension, subjecting them to a force which tends to instantaneously move each particle through the liquid in a direction determined by the instantaneous direction of the force at the point at which the particle lies and at that time, and so causing them to turn within the liquid that they receive an instantaneous rotational acceleration tending to turn them to a position such that their flattened surfaces assume a direction normal to the instantaneous direction of such force at such point and time, depositing them from such liquid while still subject to such force, and forming a solid body composed of them.

10. The method of forming solid bodies composed of flat particles in which the arrangement of the particles as regards their orientation is ordered, which consists of suspending the particles in a fluid, subjecting them to a force which tends instantaneously to move each particle through the fluid in the direction of such force at such time at the point at which the particle lies, and so causing them to turn within the liquid that their flat surfaces receive an instantaneous rotational acceleration tending to turn them into a position such that their flattened surfaces tend to assume a position normal to the direction of such force at such time and point, depositing them from such fluid while still subject to such force, and forming a solid body composed of them.

STERNE MORSE.